April 7, 1970 L. R. KELLY, JR., ET AL 3,505,476

AUTOMATIC TELEPHONE ALARM APPARATUS

Filed Jan. 3, 1967 7 Sheets-Sheet 1

INVENTORS:
LAWRENCE R. KELLY, JR.
CLYDE E. GURLEY
by [signature] Attorney

INVENTORS:
LAWRENCE R. KELLY, JR.
CLYDE E. GURLEY
by Samuel [signature] Attorney INVENTORS
LAWRENCE R. KELLY, JR.
CLYDE E. GURLEY
BY
Samuel Kliomit (signature)
Attorney INVENTORS
LAWRENCE R. KELLY, JR.
CLYDE E. GURLEY
BY
Attorney

AUTOMATIC TELEPHONE ALARM APPARATUS

Filed Jan. 3, 1967 7 Sheets-Sheet 5

INVENTORS
LAWRENCE R. KELLY, JR.
CLYDE E. GURLEY
BY
ATTORNEY

INVENTORS
LAWRENCE R. KELLY, JR
CLYDE E. GURLEY
BY
Samuel Pelonit
Attorney

AUTOMATIC TELEPHONE ALARM APPARATUS

Filed Jan. 3, 1967 7 Sheets-Sheet 7

INVENTORS
LAWRENCE R. KELLY, JR.
CLYDE E. GURLEY
BY Samuel Kelonit
ATTORNEY

United States Patent Office 3,505,476
Patented Apr. 7, 1970

3,505,476
AUTOMATIC TELEPHONE ALARM APPARATUS

Lawrence Randolph Kelly, Jr., and Clyde Edward Gurley, Washington, D.C., assignors to Pelass Systems, Inc., Washington, D.C., a corporation of the District of Columbia Filed Jan. 3, 1967, Ser. No. 606,734
Int. Cl. H04m *11/04*
U.S. Cl. 179—5 26 Claims

ABSTRACT OF THE DISCLOSURE

An apparatus, external to a telephone unit and line, for automatically detecting occurrence of fires and for notifying proper authorities of occurrences of burglaries, robberies, and fires. The apparatus is capable of being activated by various types of detectors. Operations consist of lifting a telephone receiver beyond its switch-off position, selecting modes of operation (example: robbery/burglary and fire), detecting and/or sensing an operating or readying dial-tone signal, dialing or keying a preprogrammed telephone number such as that of the Police and/or Fire Department, proprietor of a business, etc., detecting or sensing a "busy" signal, automatically redialing a pre-programmed telephone number if the line is "busy," and playing back into the telephone a prerecorded message notifying action officials of "Real-Time" occurrences of crime and/or fire.

CROSS REFERENCE TO RELATED APPLICATIONS

This invention pertains to the employment of PELASSS (Programmable External Lifting Automatic Sequential Selecting System) as a completely automatic Telephone-Dialing, Roberry, Burglary, and Fire Alarm System. Patent papers for PELASSS were filed in the U.S. Patent Office on Feb. 23, 1966 by the co-inventors of this patent document, and can be identified by Ser. No. 529,542.

BACKGROUND OF THE INVENTION

With the modifications and additions of the following unique features to PELASSS, as the heart, the system becomes a completely new, automatic detecting communications alarm system which may function as a:

(a) Burglary Detector, (b) Fire Detector, (c) Remoter radio control activation of the invention for cases of robbery, burglary and fire, (d) Multi-channel recorder for playback of alarm message, (e) Circuit that selects the right set of telephone numbers to dial police station or fire department, (f) Circuit that senses and automatically controls the automatic operations of the invention for both conditions of *"busy"* and *"Non-Busy"* telephone signals, (g) Circuit for determining what sensor activated the invention and dictates the appropriate party (Police Department or Fire Department) for the invention to contact by means of external (to the line) telephone communication. In regards to applications, the PELASSS Alarm System (PAS) is unique because required installation of equipment is minimal and quite uninvolved. This is attributable to the fact that a mode of activation of PAS can be accomplished by remote radio control.

SUMMARY

A principal object of this invention is to provide means for a *reliable, convenient, highly flexible,* and *economical combined alarm system* (robbery/burglary, fire) that's capable of automatically notifying an action party (Police, Fire Department) of the "Real Time" occurrence of a robbery/burglary or fire. The invention operates completely external to the telephone unit and line and is readily adaptable to both "Finger Dial" and "Push Button" type telephone units. A distinguishing feature that sets this invention off from other types of alarm systems is that it eliminates needs for a "Middle Action Party" (Detective Agency), by making direct contact with Action Officials (Police, Fire Department, etc.).

Figure 8:
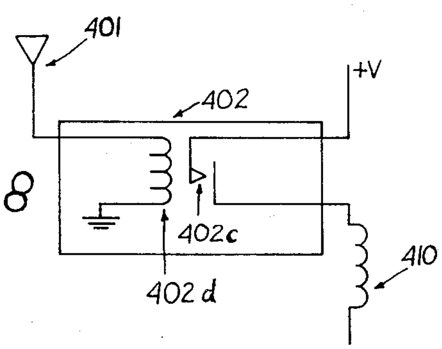
Figure 9:
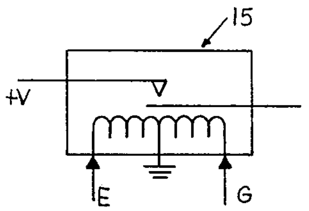
Figure 10:
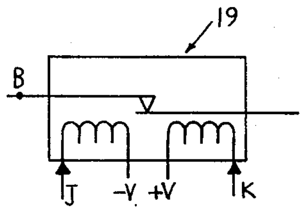
Figure 5:
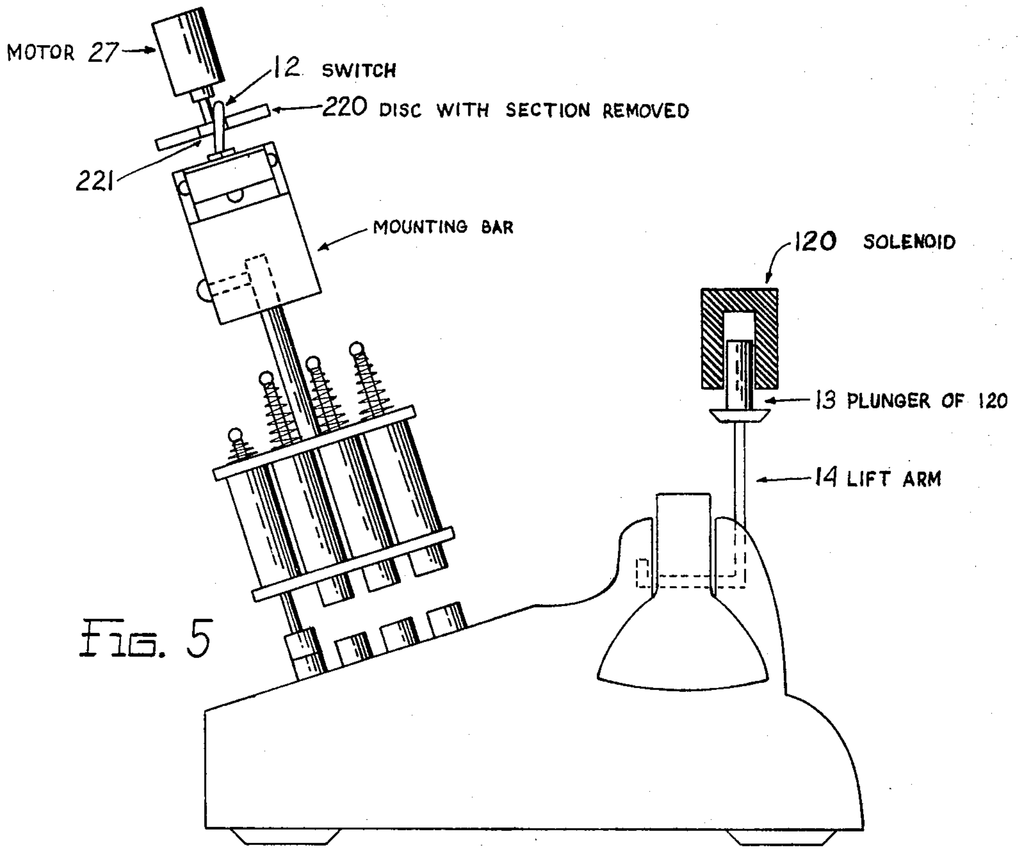
FIG. 5 is a side elevation of a telephone instrument provided with a "Push-Button" dialing panel and an overlying solenoid assembly.
Figure 5A:
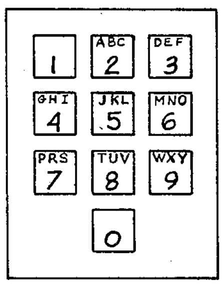
Figure 5B:
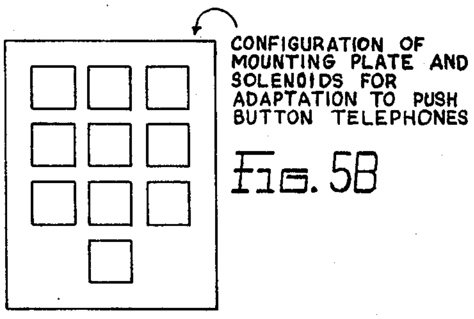
Figure 6:
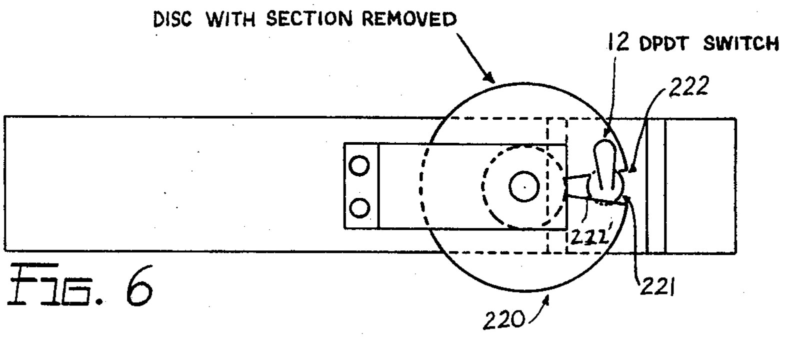
Figure 7:
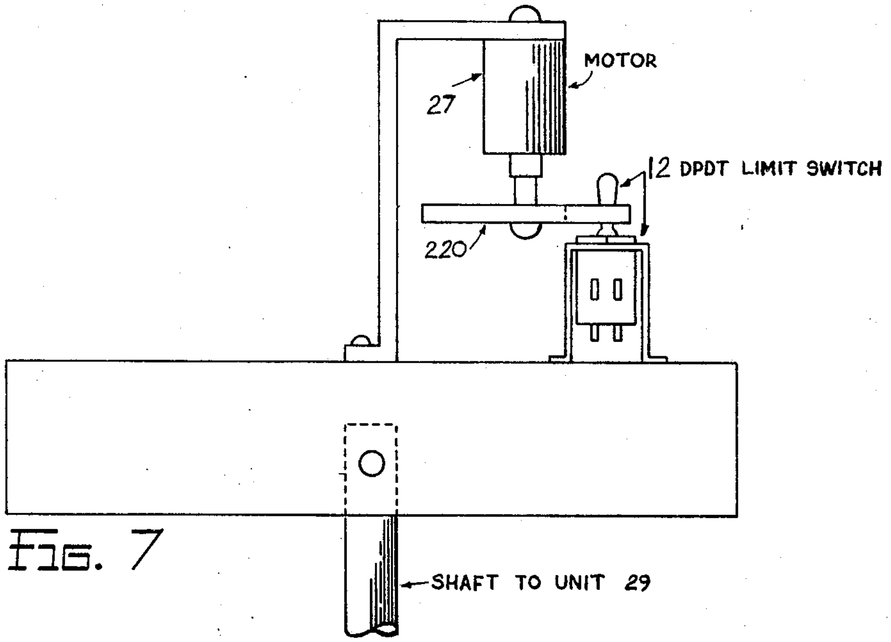

FIG. *5a* is a plan view of the push-button assembly on the telephone instrument shown in FIG. 5;

FIG. *5b* is a plan view of the layout of the solenoids in the solenoid support shown in FIG. 5;

FIG. 6 is a sectional view along line 6—6 of FIG. 5;

FIG. 7 is a front elevation of FIG. 6;

FIG. 8 is an enlarged schematic view of a portion of the radio receiver in FIG. 1 for actuating the alarm system;

FIG. 9 is an enlarged schematic view of one of the latching relays shown in FIG. 1 to clearly illustrate the operation thereof, for example, latching relays 10, 15, 18, etc.; and FIG. 10 is an enlarged view of latching relay 19 shown in FIG. 1.

DESCRIPTION OF THE PREFERRED EMBODIMENT

To describe the principle of operation of our invention, the following assumptions for two different cases or modes operation as assumed:

Case 1

(a) A robbery is in the process of being committed.

(b) The Police Station telephone number is 123–4567 and has been "preprogrammed" into PAS by the user manually dialing non-shorting rotary switches 201, 202, 203, 204, 205, 206 and 207 to the numbers 1, 2, 3, 4, 5, 6, 7, respectively.

(c) The user, which may be the bank teller, has in his possession or some inconspicuous location, a miniaturized transmitter for remote radio control of PAS.

(d) Police Station "Emergency Telephones" are "busy." Although this condition is usually unlikely, it is being assumed to show PELASSS Alarm System's flexibility in operating under a "worst case" condition.

Case 2

(a) A fire has started in some remotely located warehouse where no security guard is stationed.

(b) The fire station telehpone number is 890–1234 and has been "preprogrammed" into PAS by the user manually dialing non-shorting rotary switches 300, 301, 302, 303, 304, 305, and 306 to the numbers 8, 9, 0, 1, 2, 3, and 4 respectively.

(c) Fire Station "Emergency Telephones" are "busy." Although this condition is usually unlikely, it is being assumed to show PALASSS Alarm System's flexibility in operating under a "worst case" condition.

In the drawings positive and negative voltages +V and −V may be derived from power supply 8 which may be rectified alternating current energy, a battery supply, or any other form of direct current energy. For simplicity, the various points of the potentials are not drawn to power supply 8.

The sequence of operation for the "PELASSS ALARM SYSTEM" in notifying the Police Department of a robbery, using the assumption in Case 1, is as follows:

At the moment the bank teller is told by the potentail bank robber that "This is a stick-up" the teller activates PAS by depressing switch of coded transmitter 400 which may be in his possession or located in some inconspicuous place. It is understood that momentary push button switch 9 is an alternate means for activation of PAS.

Figure 1A:
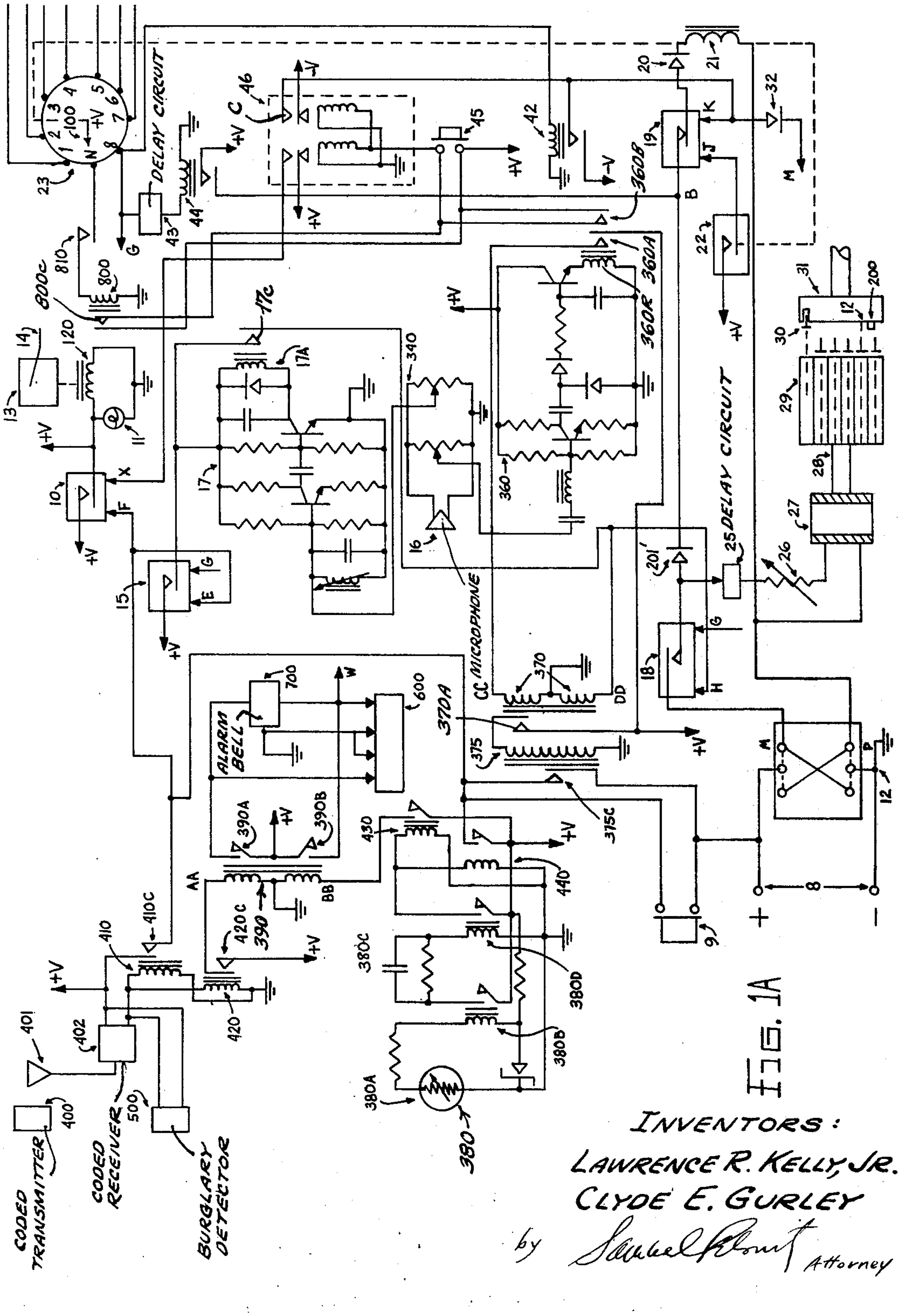
FIGS. 1A and 1B constitute a composite circuit diagram of a preferred PELASSS Alarm System (PAS) in accordance with the invention. In the drawing, solid lines represent electrical paths, while dotted lines represent mechanical linkages.
Figure 1B:
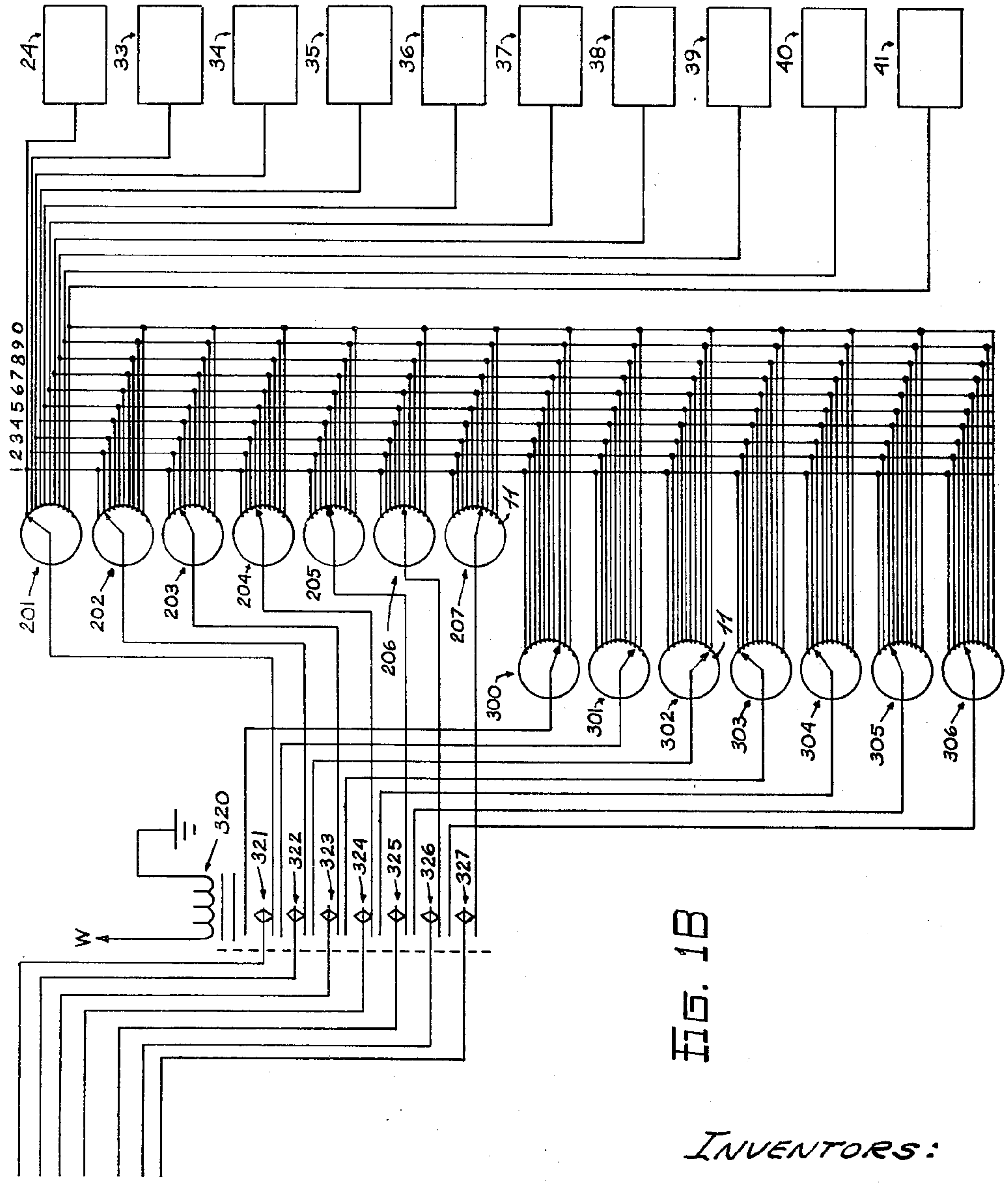
Figure 2:
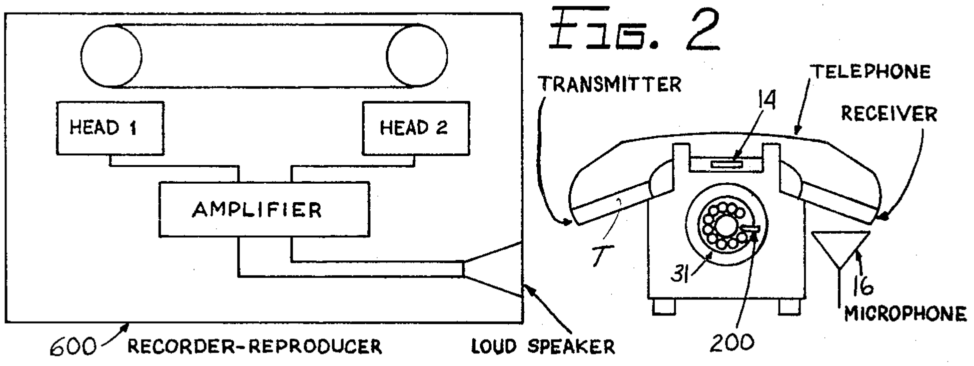
FIG. 2 is a front elevation of a telephone instrument in proximity to some of the essential components of the system as shown in FIG. 1.

The coded radio signal transmission is received through antenna 401 and coded receiver 402. Closure of contact 402*c* of detection relay 402*d* in receiver 402 (FIG. 8) applies positive voltage from power source 8 to relays 410 and 420. Upon activation of relay 420, its normally opened contact 420*c* closes and permits coil AA of latching relay 390 to become activated. Normally opened contact 390A of latching relay 390 closes and initiates operation of local alarm bell 700 if a local audible alarm is desired. The closing of contact 390A also and simultaneously switches in Channel 1 of multi-channel recorder reproducer 600. This action merely sets up Channel 1 for playback. Machine 600, which initially is in stand-by condition, starts running and plays back into the mouthpiece or transmitter T of the telephone instrument a prerecorded robbery message; see FIG. 2. Closure of contact 390A of latching relay 390 has, in the case of Case 1, no effect on point W and therefore coil W of mode of operation relay 320. Notice that the contacts of mode of operation relay 320, 7-pole double throw, is already in the setting for *robbery mode* of operation and will therefore maintain its normally closed contact positions of 321, 322, 323, 324, 325, 326, and 327 as shown in FIG. 1B. The normally opened contact position of relay 320 will be switched closed in the event of a fire when coil W of relay 320 would be activated by positive voltage through closure of contact 390B of latching relay 390 and would therefore select rotary switches 300, 301, 302, 303, 304, 305 and 306 for preprogrammed dialing of the Fire Department's telephone number, assumed as 890-1234.

Contact closure of detector relay 402*d* (FIG. 8) in coded receiver 402 also permits a positive voltage to energize relay 410. When the normally opened contact 410*c* of relay 410 closes, a positive voltage is applied to coils E and F of latching relays 15 and 10, respectively. Contact of latching relay 10 closes and applies positive voltage to monitor lamp 11 and lifting solenoid 120. Excitation of coil E of latching relay 15 causes relay 15's normally opened contact to close, thus applying supply voltage (+V) to dial-tone turned signal amplifier 17 which is tuned to the frequency of the dial-tone, thus turning it on, as disclosed in our aforesaid application Ser. No. 529,542.

Solenoid 120, being energized, forces its plunger 13 in a vertical upward direction. Lift arm 14, connected as shown in FIG. 1A to plunger 13, physically lifts the telephone receiver beyond its switched off position, whereupon a dial-tone is allowed to register. The dial-tone is picked up by microphone 16 (FIGS. 1A and 2), and fed through impedence matching mixer 340 into tuned amplifier 17. The series resonance wave trap, tuned to the dial-tone frequency, prevents the dial-tone from entering the count integrator-amplifier 360.

Tuned amplifier 17 amplifies dial-tone signal, assuming it is present, and causes relay 17A of amplifier 17 to become energized. Energization of relay 17A causes its normally opened contact 17*c* to close, thus applying positive voltage to coil H of latching relay 18 which may be considered the main switch. This action closes latching relay 18's normally opened contact thereby feeding positive voltage from 8 through double-pole double-throw switch 12 to point M for application to delay circuit 25 and latching relay 19, whose contact is normally closed. Diode 201′ is simply a blocking diode. Switch 12, which acts as a *position limit switch,* is assumed to be in the position such that a positive voltage is applied to point M. It is understood that the negative side of the line is taken directly from the negative terminal of power source 8. Similarly, the cathode of diode 32 is positive and the other side of coil K is connected to the positive side of power source 8, (FIG. 10).

Positive voltage is therefore passed through diode 20′ latching relay 19, and diode 20, and applied to electromechanical stepping switch coil 21. The application of this voltage *physically cocks* or sets stepping switch 23 for an increment of movement. Diode 32 blocks positive voltage to coil K of relay 19. Simultaneous with this action, relay 22's contact, which is mechanically linked with the action of coil 21, is physically closed in response to the energization of coil 21 and applies a positive voltage to coil J of latching relay 19. Excitation of coil J causes the normally closed contact of latching relay 19 to open. This action disconnects the positive voltage to coil 21. Disruption of the voltage to coil 21 causes wiper arm 100 of stepping switch 23 to step from its neutral (N) position to position 1.

Figure 3:
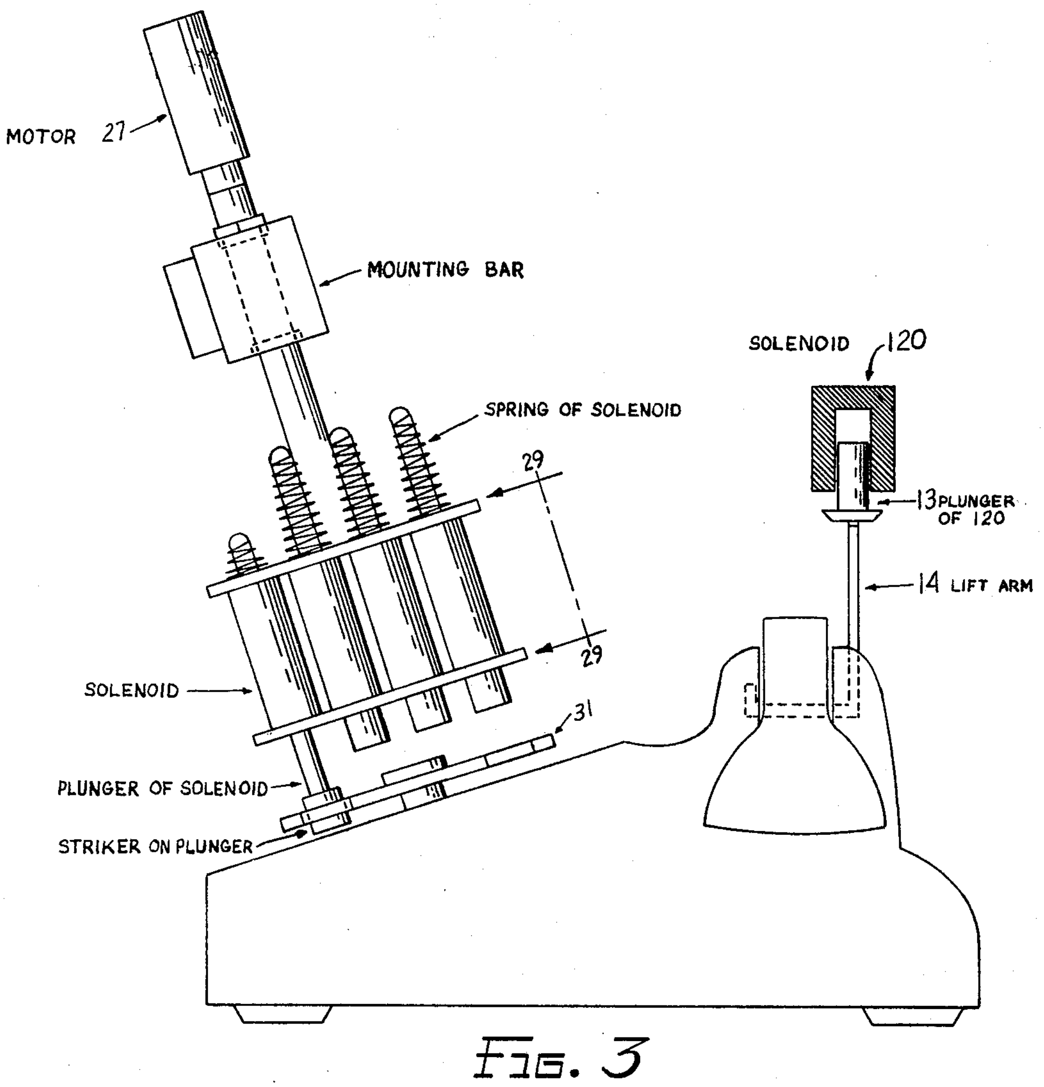
FIG. 3 is a side elevation of a telephone instrument showing the physical arrangement of the elements illustrated schematically at the bottom of FIG. 1.
Figure 4:
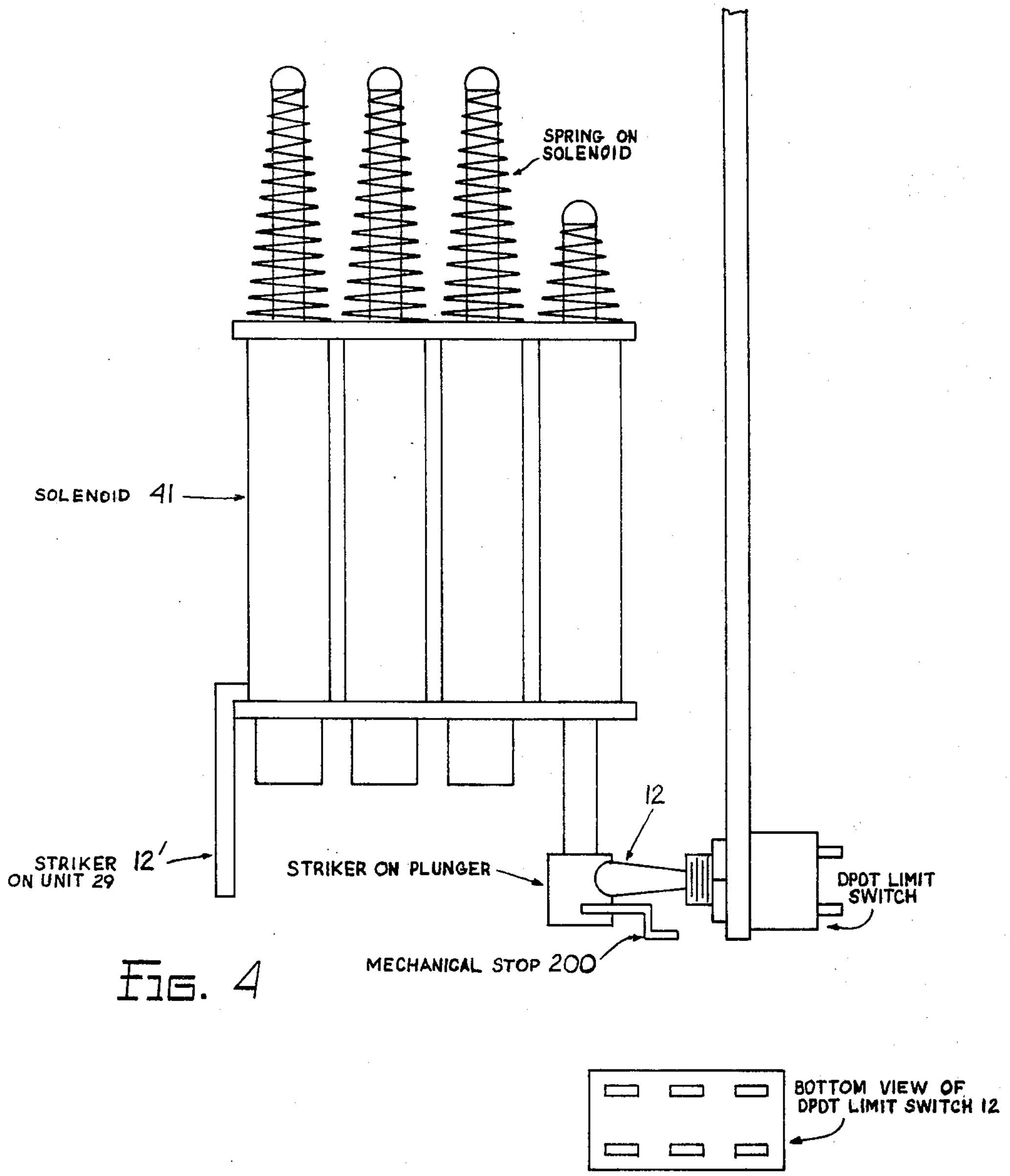
FIG. 4 is an enlarged side view of the rotary solenoid support which is adapted to be arrested by the mechanical stop in the path of the plunger extending within one of the dialing holes, whereat a switch reverses the direction of the motor for the return travel of dialer disc 31, at the ends of which a striker 12′ mounted on the solenoid support adjacent to the mechanical stop trips the toggle switch back to its normal position.

Position 1 of stepping switch 23 is connected to the selector main terminal or armature of rotary switch 201 through normally closed contact 321 of latching relay 320. Positive voltage, connected to wiper arm 100, is thus fed through to solenoid 24 by way of relay contact 321 and position 1 of rotary switch 201. Solenoid 24 is therefore activated and forces its plunger, against its spring bias, into the number one (1) hole of the telephone's finger dial unit 31 (FIGS. 1A and 3).

Immediately following the closing of the contact of latching relay 18, positive voltage is also applied to delay circuit 25. Rheostat 26 serves as the speed controller for the DC motor and gear mechanism 27. After the application of power to delay circuit 25 and the activation of solenoid 24, unit 27 starts and physically rotates the shaft 28 extending therefrom and the mounting support 29 containing solenoids 24, 33, 34, 35, 36, 37, 38, 39, 40 and 41 together with the telephone finger dialing disc 31 which is coupled to the support 29 by the plunger of solenoid 24. This rotation is in a clockwise direction until the mechanical stop 200, adjacent to the dialing disc, is reached.

At this very instant the striker of plunger 30 and of solenoid 24, strikes limit switch 12, thus reversing the power to unit 27 and causing it to return toward its original position in a counterclockwise direction. The cathode of diode 32 becomes negative, with this switching action, thus activating coil K of latching relay 19 to close the contact of latching relay 19.

Upon return of unit 29 back to its original position, all ten solenoids—24, 33, 34, 35, 36, 37, 38, 39, 40, 41 arrive in line with the ten circular holes of the telephone's dialing disc, and limit switch 12, which may be an easy action toggle switch is knocked back to its original position by striker 12′ on unit 29. This striker 12′ is located behind solenoid 41 in the path of toggle switch 12.

Point M of switch 12 again becomes positive and connects to stepping switch coil 21 through units 18, 201′, 19, and 20. This action *cocks* stepping switch 23 and mechanically closes the contacts of relay 22. The contact of latching relay 19 is opened by application of positive voltage through relay 22 to coil J of relay 19. For reasons of simplicity in FIG. 1A, the other side of coil J of relay 19 is not shown and is understood to be connected to the negative terminal of power source 8.

The opening of the contact of relay 19 constitutes a pulse, therefore wiper arm 100 of stepping switch 23 moves to position 2 of switch 23. At this instant, solenoid 24 is deenergized and plunger 30 is *retracted* from dial position number "1" and solenoid 33 becomes energized through relay contact 322 and adjustable armature or rotary switch 202 and causes its plunger to extend into dial position number "2" of unit 31. It should be recalled that the number "programmed" and assumed for automatic dialing is "123–4567" and that the commencing of dialing is subject to reception of the dial tone. The second digit, "2" of this assumed number is ready for dialing.

Slightly delayed in time with respect to the activation of solenoid 33, motor-gear mechanism 27 and shaft 28 rotates units 29 and 31 in a clockwise rotation until the striker on the plunger of solenoid 33 strikes limit switch 12 which is coincident with the mechanical stop 200 of the telephone. Switch 12 flips, and places point M at a negative potential. At the same time the contact of relay 19 closes as the result of coil K being activated through point M of diode 32 going negative.

Units 27 and 28 rotates units 29 and 31 counterclockwise and back to the original position. When switch 12 is moved by striker 12' on unit 29, point M again becomes positive. Diode 32 blocks this voltage from coil K of relay 19, thus allowing contact of relay 19 to remain closed. The positive voltage passes through relays 18, 19 and diodes 201' and 20 to coil 21 and cocks stepper switch 23. Relay 22's contact is caused to close and activate coil J of relay 19 thus causing relay 19 contact to open. This constitutes a pulse thus causing wiper arm 100 of stepper switch 23 to step to position 3. This action deactivates solenoid 33.

Wiper arm 100 of switch 23, being connected to solenoid 34 through relay contact 323 and position 3 of rotary switch 203, energizes solenoid 34. Units 27 and 28, delayed in time to allow solenoid 34's plunger to insert itself into hole 3 (DEF) of dialer unit 31, rotates 29 and 31 clockwise until striker of solenoid 34 strikes limit switch 12. Point M becomes negative and the contact of relay 19 closes. Upon return of units 29 and 31 to their original position, the striker 12' on unit 29 knocks limit switch 12 to its original position.

The automatic dialing of digits "4" (GHI), "5" (LKJ), "6" (MNO), and "7" (PRS) are carried out in the same manner as that described for digits "1," "2" (ABC), and "3" (DEF).

Routine sequence of operation changes when dialing action is completed for digit "7" (PRS), the last digit of the number assumed for dialing. When the striker 12' of unit 29 strikes switch 12 back to its original position, point M becomes positive, switch 23 cocks, coil 21 is energized and switch 22 is mechanically closed, thus causing relay 19's contact to open. This constitutes a pulse and causes wiper arm 100 of switch 23 to step to position 8. Solenoid 38 is de-energized and its plunger with its striker is retracted out of unit 31.

Position 8 of switch 23 applies a *reset* positive voltage to coil G of relay 15 and coil G of relay 18. This action places relays 15 and 18 back into their normally open position.

By relay 18's contact opening, power to motor and gearing unit 27 is cut off immediately. Because of delay circuit 25 filtering out positive voltage, applied between the time point M becomes positive and relay 18's contact opens, units 29 and 31 remain lined up in their *normal* and *original* rest position.

Also upon reaching position 8 of switch 23, relay 42 is energized and upon closing its contact, it applies a negative voltage directly to coil K of relay 19, thus closing the contact of relay 19. This action is necessary because the contact of relay 19 was not closed since dialing operations terminated with digit "7" and point M did not become negative again.

Delayed in time from the action of relay 42, relay 44 is activated through delayed action of delay circuit 43. Upon closing of contact of relay 19, a positive voltage is fed through closed contact of relay 44's contact to point B and through relay 19 and diode 20 to stepper coil 21. This action cocks switch 23 and mechanically closes relay 22. Coil J of relay 19 is activated, opening contact of relay 19 thus constituting a pulse. Wiper arm 100 of switch 23 then rotates to the neutral position.

This completes the automatic dialing of the assumed Police Station telephone number.

Upon completion of dialing the pre-programmed number 123–4567, the phone at the police station registers a "busy signal" (assumed for Case 1). Microphone 16 detects the "busy signal" and feeds it through mixer 340 to count integrator-amplifier 360. The "busy signal" does not get into dial-tone amplifier 17 due to front end rejection by the tuned circuit in amplifier 17, which is tuned to the dial tone. Amplifier 360, upon reception of "busy signal," activates relay 360R which closes its contacts 360A and 360B. The closing of the former energizes relay 370 causing its normally opened contact 370A to close. This action initiates a time delayed activation of relay 375. Contact 360B of relay 360R also closes and shorts out terminals of momentary switch 45. Shorting of switch 45's terminals permits relay 46 to become activated. Activation of relay 46 causes a change in state of latching relay 10 through excitation of coil X thus disconnecting voltage to monitor lamp 11 and lifting solenoid 120. Simultaneous with activation of relay 46, a negative voltage through contact C of relay 46 is applied to coil K of latching relay 19 to ensure closure of latching relay 19's contact.

Disruption of voltage causes solenoid 120 to become de-energized thereby causing the telephone receiver to "hang-up" or to fall to inoperative position. Time delay relay 375 is activated as a result of the closing of the normally opened contact 370A of relay 370. The closing of normally opened contact 375*c* of relay 375, connected across the terminals of momentary push button switch 9, is delayed in time by an amount exceeding that critical time required between hanging up a phone and lifting the phone up for registration of a dial-tone. Upon closing contact 375*c* of relay 375, a positive voltage is applied to coil F and coil E thereby resetting latching relays 10 and 15's opened contacts to closed positions. This action causes reactivation of lifting solenoid 120 and reapplication of supply voltage (+V) to dial-tone amplifier 17. At this point in time, the telephone's receiver is physically lifted beyond its communication cutoff position and registers a dial-tone.

Once a dial-tone is detected through microphone 16, mixer 340 and tuned tone amplifier 17, automatic dialing of the same number (123–4567) commences in the same manner, as explained above. *The automatic redialing of the same number will continue until the telephone line (police station number) is detected as not being "busy."*

Upon reception of a "non-busy signal" the phone receiver will remain in communication lifted position. This action is factual because the pulse repetition frequency of a "non-busy signal" is not as great as the "busy signal" to cause count integrator-amplifier 360 to register. When count integrator-amplifier 360 is not energized, coil X of latching relay 10 is not activated, thereby not affecting energization of lifting solenoid 120.

It should be noted from FIG. 1A that commencing with and during the *automatic redialing* of the same number that latching relay 390's coil AA and therefore its contact 390A are always activated. This means that playback of meassage to the police on Channel 1 on recorder 600 will always be heard at the time the telephone line becomes "*not busy*" or open for communications, when the police respond to the normal "*ringing tone*" of the system.

Once the police arrive at the scene, the PELASSS Alarm System can be reset to stand-by position by depressing momentary push button switch 45. As an added feature, however, adjustable time delay relay 800 can automatically reset PAS back to stand-by position some preset time after completion of dialing and playback of message. Switch 810, placed in series with relay 800, dictates manual or automatic time delay resetting of the PELASSS Alarm System by merely being in the open or close position, respectively. Voltage for time delay relay 800 is obtained from the neutral position of stepping switch 23. Functioning of time delay relay 800 and closure of its contact 800*c*, which is connected across terminals of switch 45, depends on application of a voltage for a time equalling to or exceeding the preset delay time of relay 800. Therefore relay 800 is always synchronized with the dialing and/or redialing of PAS and will automatically control the resetting of PAS only at some preset time following communications contact with action officials.

The same sequence of operations as explained in Case 1 will take place if contact closure within Burglar Detector 500 (radar, sonic, optical, taped windows, etc.) takes place and shorts out momentary push button switch 9's terminals. Similarly, the same sequence of operation of PAS will be initiated if momentary push button switch 9 is manually depressed.

To describe Case 2 wherein it is assumed that a fire has started in some remote location, explanation of *preferred* Fire Detector Circuit 380 will first be given by reference to FIG. 1A. A sensitive, negative temperature coefficient *Thermistor 380A* is selected to detect, in conjunction with a variable current limiting-sensitivity resistor, threshold levels of ambient temperature deemed abnormal when exceeded. When the ambient temperature exceeds the predetermined temperature threshold, thermistor 380A has decreased in electrical resistance to such a value as to allow an activating voltage to appear across the coil of relay 380B. Energization of relay 380B causes its normally opened contact to close thus permitting capacitor 380C to charge up to the positive voltage with respect to ground. Upon closure of relay 380B's contact, however, relay 380D is activated because capacitor 380C cannot charge instantaneously. The resistor across capacitor 380C is connected for discharge purposes provided leakage resistance of the capacitor is not low enough for discharge at a reasonable rate. Activation of relay 380D causes its normally opened contact to close thus activating relays 430 and 440. Upon activation of relay 430, its normally opened contact closes thereby connecting a positive voltage to coil BB of latching relay 390. Similarly, when relay 440 is activated, its normally opened contact closes and applies a positive voltage to coils E and F of relays 15 and 10 respectively.

Closure of relay 380D's contact therefore initiates operation of the PELASSS Alarm System in the same fashion as units 402 and 500 are capable of doing. Of importance is the fact that closure of relay 380D's contact initiates a positive voltage to coil BB of latching relay 390 via relay 430's contact. Activation of latching relay 390, causes it to change state and forces its contact 390B to close and 390A to open. This action also causes energization of relay 320 which in turn causes its contacts 321, 322, 323, 324, 325 and 326 to switch from its normally closed positions to its alternate normally opened positions. By this switching action, the PELASSS Alarm System is ready for dialing of the preprogrammed Fire Department number (assumed as 890–1234) since rotary switches 300, 301, 302, 303, 304, 305, and 306 are individually connected to the normally opened positions.

Solenoids 24, 33, 34, 35, 36, 37, 38, 39, 40 and 41 will therefore be controlled in their individual energizations through rotary switches 300, 301, 302, 303, 304, 305 and 306.

Other than those conditions specified above for preferred Fire Detector Circuit 380, the change in state of latching relay 390 and consequently the change in state of mode of operation relay 320 and its contacts, the entire sequence of operation for the PELASSS Alarm System explained under Case 1 for Robbery Detection and Reporting applies to Case 2 for Fire Alarm Detection and Reporting.

It is noted that Fire Detector Circuit 380 is preferred for employment because of, among other things, its simplicity, smallness in size, low cost and sensitivity. However, it is recognized that existing fire detectors can be employed as accessories to the PELASSS Alarm System. It is interesting to note that relay 380D's contact closure can be used to initiate activation of a coded transmitter. This action would eliminate excessive wiring installation. Such an advantage as this could also apply to any other types of detectors.

With the PELASSS Alarm System, the user has the option of *preprogramming any telephone number for dialing* in any case where there are needs for notifying a potential action party, for example: an invalid left at home by himself and needing help from outside of his home. Although FIGS. 1A and 1B delineate PAS as set up to dial a seven digit number, it is to be noted that the *concept of this invention allows for dialing* of *any* number of digits of *any* combination (Permutation-Combination). The number of digits required for dialing is merely governed by a one to one ratio of the rotary switches to digits—that is to say, a seven digit telephone number would require seven rotary switches. Since there are only 1 out of 10 digits that can be chosen for each one of the seven digit telephone number, then the rotary switches in this case need only have at least ten (10) positions.

If the user of the PELASSS Alarm System wanted to notify the police or fire department of troubles through the "telephone operator," it would only be necessary to set the last of the series of rotary switches to read "0" (all other switch positions would be dialed to a blank position). For example: To dial "Operator" (0), six of the rotary switches are to idle position 11. It is important to note, however, only the switch position 10 of rotary switch 207 or 306 is connected to a solenoid. This solenoid is 41 and corresponds to the number "0."

After the depression of momentary switch 9 or by other aforementioned methods, six complete sequences of operations takes place before a solenoid is activated. This is accomplished with a striker, *physically located behind solenoid 41*, that trips switch 12 on every cycle of rotation except the last or seventh in the sequence of dialing. On the beginning of the seventh sequence, solenoid 41 is activated and causes its plunger to be inserted into finger hole "0" of unit 31. Subsequent to dialing of this number, wiper arm 100 of switch 23 is eventually returned to the neutral (N) position as explained above.

It should be noted that unit 27 is adjusted such that its operational speed is compatible with a nominal speed for manually dialing a telephone.

It is noted that through minor modifications the PELASSS Alarm System is readily adaptable to selector type telephone systems for example, push button telephones, see FIGS. 5, *5a* and *5b*. In this case solenoids 24, 33, 34, 35, 36, 37, 39, 40 and 41 *are stationary* to coincide with the proper selector positions consisting of the telephone push buttons. A disc, 220 with a radial sector 221 exercised therefrom, or a lever for switching polarity switch 12 is attached to the gear and motor unit 27, see FIGS. 6 and 7. Note that in this scheme *no rotation of solenoids will occur*. Since the dialing impulses are transmitted upon the depression of a button by the plunger of the solenoid rather than during the return movement of the dialing disc, the disc and the solenoid mounting bracket replaces unit 29. Switch 12 is mounted such that it is manipulated by the oscillating action of the disc or lever arm and therefore retains its primary described function. With this invention a greater speed of dialing operation will be realized using the push button type telephone versus the conventional rotational dial type. Thus, the initiation of the alarm system as described above is the same for a push button telephone instrument as a rotary dial instrument. However, when the stepping switch is moved from its neutral position N to its first position 1, a circuit is immediately completed for the energization of whatever solenoid 24 to 41 is energized by the completion of the circuit from the energy source +V through the wiper arm 100 of the stepping switch, position 1, contact 321, adjustable switch 201 and the solenoid connected to the movable armature thereof, which in the illustrated embodiment shown in FIG. 1B is solenoid 24. The signalling pulses caused by the depression of the telephone button 1 is immediately transmitted through the telephone line. When motor 27 is energized after a short time delay, occasioned by the delay circuit 25, it rotates the disc 220 until the advancing edge 222 of the excised section 221 throws switch 12 into reversed position, which reverses motor 27 in the same manner as was done by the striker or plunger of the solenoid overlying the rotary dial when the mechanical stop 200 and reversing switch thereat were reached by the rotary movement of the solenoid assembly. Upon reversal of the motor, the opposite 222' of the excised sector 221 actuates switch 12 to restore positive voltage to point M, which, as described above, physically cocks stepping switch 23, and which upon opening of latching relay 19, permits the advance of the stepping switch to its second position, which effects the deenergization of solenoid 24 and the energization of that solenoid connected to adjustable switch 202 by the way of contact 322 in circuit with position 2 of stepping switch 23. The signalling pulses arising from the depression of button 2 of the telephone instrument are transmitted over the telephone lie, and upon energization of motor 27 and movement of disc 220, the switch 12 is operated to reverse the rotation of motor 27. The reversal of motor 27 causes edge 222$^1$ to throw switch 12 back to its original position to institute the advance of the stepping switch 23 to its next position. This cycle of these operations is repeated, as described above in conjunction with the rotary dialing mechanism.

It is important to note that the circuit shown in FIGS. 1A and 1B is the *preferred scheme* only from a *cost* and *simplicity* of construction aspect. Electronic circuits were first considered and used as the preferred circuit, however, it was realized that the assets of speed and size, afforded by electronics, are not required. The development of electronic circuits to perform the same functions as the electro-mechanical devices (latching relays, mechanical stepping switch, etc.) was therefore considered unwarranted. For example, the *logical* set-reset *flip-flop* can be used in place of the latching relay; however, the flip-flop is a more *complicated* and sometimes more *costly* device. The micro-second response times of flip-flops are not required in our invention. This invention involves millisecond response times and the state-of-the-art latching relays are perfectly capable of these response times. If greater demands in scope of operations for this invention under its concept and use of smaller components becomes necessary, then micro-electronics such as thin film, magnetic erase and/or non-erase memory units or integrated circuits can be employed, but at an apparent added *cost*.

It is recognized that the function of the mechanical stepping switch, in this invention, can be performed electronically by a *"Ring Counter"* or a *"Four Stage Binary to Decimal Counter"* (*with associated diode matrixes*). However, the tradeoff here would be speed and size for *low cost*. As mentioned before, high speed circuits are not required and size is not considered an important factor.

It is further recognized that standard general purpose multipole, multiposition relays with associated latching circuit may be substituted for the latching relays.

It will become apparent that embodiment delineated herein is only examplary and that various modifications can be made in construction and arrangement within the scope of the invention as defined in the appended claims.

We claim as our invention:

1. A telephone communication system for automatically dialing any desired pre-settable telephone number in response to the occurrence of a predetermined event, comprising (a) a plurality of circuit-closers connected to a direct-current electrical energy source, adapted to be closed selectively upon the occurrence of any one of a plurality of predetermined events, (b) a solenoid operated in response to the closure of one of said circuit-closers for mechanically lifting the telephone instrument from its support to condition the telephone line for intelligence transmission and the initiation of a dial tone in the receiver of said instrument, (c) control means derived from said audible dial-tone energy for producing a plurality of successive energy pulses, (d) a stepping switch operated by said energy pulses having a plurality of contacts of at least the number of digits required to dial the number of a called party, (e) a plurality of groups of adjustable switches, each group adapted to be selected by different ones of said first-mentioned circuit-closers, (f) each group of said last-mentioned switches comprising a plurality of adjustable switches of at least a number corresponding to the number of digits in the number to be dialed, and adapted to be pre-set to any desired number to be called, each adjustable switch having a movable armature connected to one of the contacts of said stepping switch in the succession of the digits of the number being called and in the order of the successive movement of said stepping switch over said plurality of contacts from a neutral position, and each adjustable switch also having at least a plurality of terminals, adapted for selective contact with said armature corresponding in number to the dialing positions of the telephone instrument, (g) a plurality of electrical solenoids having movable plungers and energizing coils therefor, overlying each of the dialing positions of the telephone instrument to initiate automatically the required dialing operation, each of said coils being connected to a corresponding terminal of each of said pre-set adjustable switches in each group of switches, and adapted to be energized upon the coincidence of the set position on the latter with the sequential position of the stepping switch corresponding to the position of the desired digit in the group of digits constituting the called number, (h) means controlled by the occurrence of a predetermined event for selecting automatically the appurtenant group of adjustable switches for cooperation with said stepping switch, (i) means for completing the required dialing operation at each successive station of said stepping switch and advancing said switch to the next successive contact thereof, and (j) means comprising a terminal contact at said stepping switch for re-setting the system to its original idle position.

2. An apparatus as set forth in claim 1, wherein at least some of said adjustable switches include an idle terminal in addition to the plurality of terminals corresponding to the number of dialing positions of the telephone instrument to enable the successive cycling of said stepping switch without energization of selective electrical solenoids.

3. An apparatus as set forth in claim 1, including a pre-recorded message-reproducing device relevant to the occurrence of said predetermined events, and means for energizing said device by the operation of said circuit-closers for the transmission of the desired message into the mouthpiece of the telephone instrument.

4. An apparatus as set forth in claim 3 including a remotely located radio transmitter for actuating one of said circuit-closers.

5. An apparatus as set forth in claim 3 including a burglary-detector sensing device for actuating one of said circuit-closers.

6. An apparatus as set forth in claim 3 including a thermal sensing device for actuating one of said circuit-closers.

7. An apparatus as set forth in in claim 1, including a pre-recorded message-reproducing device relevant to the occurrence of said predetermined events and containing a plurality of messages corresponding in number to the groups of said adjustable setting switches, and means for automatically selecting the message for transmission concommitantly with the selection of the group of setting switches appurtenant thereto.

8. An apparatus as set forth in claim 1, including a pickup microphone in proximity to the receiver of the telephone instrument, and an amplifier for the audible energy issuing therefrom.

9. An apparatus as set forth in claim 8, including a magnetic relay adapted to be energized by the amplified dial tone energy, and a main switch controlled by said relay for completing an electrical circuit from the direct current electrical energy source to said control means with a reversible direct-current motor in shunt to the latter.

10. An apparatus as set forth in claim 9, wherein said control means comprises (a) a coil winding for said stepping switch, (b) mechanical means for physically cocking said stepping switch for an increment of movement in response to the energization of said coil-winding, (c) an auxiliary magnetic relay comprising a normally closed switch in circuit with said coil winding, and (d) auxiliary mechanical means responsive to the energization of said coil winding for energizing said auxiliary magnetic relay to effect the opening of said last-mentioned switch and thereby to de-energize said coil winding, thereby to produce the energy pulse which permits said stepping switch to complete the increment of movement for which it had been cocked.

11. An apparatus as set forth in claim 1, including a control relay connected to the starting contact of said stepping switch for automatically inactivating the system after a predetermined period following the completion of the desired intelligence transmission to the called party.

12. An apparatus as set forth in claim 11, including a circuit-breaker between said control relay and starting contact of said stepping switch to require the manual inactivation of the system.

13. A telephone communication system for automatically dialling any desired pre-settable telephone number in response to the occurrence of a predetermined event, comprising (a) a plurality of circuit-closers connected to a direct-current electrical energy source, adapted to be closed selectively upon the occurrence of any one of a plurality of predetermined events, (b) a solenoid operated in response to the closure of one of said circuit-closers for mechanically lifting the telephone instrument from its support to condition the telephone line for intelligence transmission and the initiation of a dial tone in the receiver of said instrument, (c) a pick-up device in proximity to said receiver of said telephone instrument, and an amplifier for the audible energy issuing therefrom, (d) a magnetic relay adapted to be energized by the amplified dial tone energy, (e) control means responsive to the operation of said magnetic relay for producing a plurality of successive energy pulses and comprising a main switch for completing an electrical circuit from the direct-current electrical energy source to said control means with a reversible direct-current motor in shunt to the latter, (f) a stepping switch operated by said energy pulses having a plurality of contacts of at least the number of digits required to dial the number of a called party, (g) a plurality of groups of adjustable switches, each group adapted to be selected by different ones of said first-mentioned circuit-closers, (h) each group of said last-mentioned switches comprising a plurality of adjustable switches of at least a number corresponding to the number of digits in the number to be dialed, and adapted to be preset to any desired number to be called, each adjustable switch having a movable armature connected to one of the contacts of said stepping switch in the succession of the digits of the number being called and in the order of the successive movement of said stepping switch over said plurality of contacts from a neutral position, and each adjustable switch also having at least a plurality of terminals, adapted for selective contact with said armature, corresponding in number to the dialing positions of the telephone instrument, (i) a plurality of electrical solenoids having movable plungers and energizing coils therefor, overlying each of the dialing positions of the telephone instrument to initiate automatically the required dialing operation, each of said coils being connected to a corresponding terminal of each of said pre-set adjustable switches in each group of switches, and adapted to be energized upon the coincidence of the set position on the latter with the sequential position of the stepping switch corresponding to the position of the desired digit in the group of digits constituting the called number, (j) means controlled by the occurrence of a predetermined event for selecting automatically the appurtenant group of adjustable switches for cooperating with said stepping switch, (k) means for completing the required dialing operation at each successive station of said stepping switch and advancing said switch to the next successive contact thereof, (l) means comprising a terminal contact at said stepping switch for re-setting the system to its original idle position, (m) said control means comprising a coil winding for said stepping switch, mechanical means for physically cocking said stepping switch for an increment of movement in response to the energization of said coil-winding, an auxiliary magnetic relay comprising a normally closed switch in circuit with said coil winding, auxiliary mechancal means responsive to the energization of said coil winding for energizing said auxiliary magnetic relay to effect the opening of said last-mentioned switch and thereby to de-energize said coil winding, thereby to produce the energy pulse which permits said stepping switch to complete the increment of movement for which it had been cocked, and (n) a delay circuit in series with said motor to interpose a short time delay in the forward operation of the motor relative to the energization of the electric solenoids.

14. An apparatus as set forth in claim 13, including a double-pole double-throw electrical switch in circuit with said direct current electrical energy source for reversing the polarity of said source to said motor and to said control means for the production of the successive energy pulses.

15. An apparatus as set forth in claim 14, wherein the means for completing the dialing operation comprises (a) a support for said electric solenoids adapted to be driven by said motor,
(b) a rotary dialing disc on the telephone instrument provided with a plurality of circular openings therein below said electric solenoids adapted to have one of the plungers engage the opening therebelow in response to the energization of the coil appurtenant to said solenoid, said dialing disc adapted to be entrained by the plunger of said solenoid in a clockwise rotary direction in conformity with the forward movement of said motor,
(c) a mechanical stop on said telephone instrument for arresting the clockwise movement of said rotary dialing disc,
(d) said double-pole double-throw switch being positioned adjacent to said mechanical stop and having an operating lever therefor in the path of the plunger of the energized solenoid to effect the throw of the lever in the reverse direction at the conclusion of the forward movement of the dialing disc.

16. An apparatus as set forth in claim 15, including a striker lug mounted on said rotary solenoid support adjacent to said mechanical stop in the idle position thereof, to actuate said operating lever for said double-pole double throw switch at the conclusion of the return movement of said dialing disc to re-set said last-mentioned switch for the operation of the motor in a forward direction and the generation of the next successive energy pulse for advancing the stepping switch to its next contact, for de-energizing the solenoid which has completed its controlling movement, and for energizing the solenoid which is connected to said next contact of said stepping switch.

17. An apparatus as set forth in claim 16, wherein said striker lug on said rotary solenoid support complements the idle terminals on said adjustable switches, the setting on which causes no energization of any solenoid, whereupon said lug actuates said operating lever for said double-pole double-throw switch into one position at the conclusion of the forward movement of the support, and throws back said operating lever to its original position at the conclusion of the reverse movement of the support.

18. An apparatus as set forth in claim 14, wherein the means for executing the dialing operation comprises (a) a support for said electrical solenoids overlying a plurality of push-buttons arranged in a predetermined pattern and adapted to be depressed successively by the movable plungers of the solenoids,
(b) an auxiliary support for said double-pole double-throw switch, and
(c) means for actuating said last-mentioned switch between its two alternative positions connecting to and driven by said motor.

19. An apparatus as set forth in claim 18, wherein said last-mentioned means comprises a disc plate driven by said motor having a radial sector excised thereof, and an operating lever for said switch disposed within said sector adapted to be thrown to its alternate positions by the opposite edges of said excised sector as the motor rotates in opposite directions.

20. A telephone communication system for automatically dialing any desired pre-settable telephone number in response to the occurrence of a predetermined event, comprising (a) a plurality of circuit-closers connected to a direct-current electrical energy source, adapted to be closed selectively upon the occurrence of any one of a plurality of predetermined events,
(b) a solenoid operated in response to the closure of one of said circuit-closers for mechanically lifting the telephone instrument from its support to condition the telepuhone line for intelligence transmission and the initiation of a dial tone in the receiver of said instrument,
(c) a pick-up device in proximity to said receiver of said telephone instrument, and an amplifier for the audible energy issuing therefrom,
(d) a secondary amplifier for the audible energy issuing from the receiver of the telephone instrument selectively operable to amplify only the energy of a "busy signal,"
(e) control means derived from said audible dial-tone energy for producing a plurality of succesesive energy pulses,
(f) a stepping switch operated by said energy pulses having a plurality of contacts of at least the number of digits required to dial the number of a called party,
(g) a plurality of groups of adjustable switches, each group adapted to be selected by different ones of said first-mentioned circuit-closers,
(h) each group of said last-mentioned switches comprising a plurality of adjustable switches of at least a number corresponding to the number of digits in the number to be dialed, and adapted to be preset to any desired number to be called, each adjustable switch having a movable armature connected to one of the contacts of said stepping switch in the succession of the digits of the number being called and in the order of the successive movement of said stepping switch over said plurality of contacts from a neutral position, and each adjustable switch also having at least a plurality of terminals, adapted for selective contact with said armature, corresponding in number to the dialing positions of the telephone instrument,
(i) a plurality of electrical solenoids having movable plungers and energizing coils therefor, overlying each of the dialing positions of the telephone instrument to initiate automatically the required dialing operation, each of said coils being connected to a corresponding terminal of each of said pre-set adjustable switches in each group of switches, and adapted to be energized upon the coincidence of the set position on the latter with the sequential position of the stepping switch corresponding to the position of the desired digit in the group of digits constituting the called number,
(j) means controlled by the occurrence of a predetermined event for selecting automatically the appurtenant group of adjustable switches for cooperation with said stepping switch,
(k) means for completing the required dialing operation at each successive station of said stepping switch and advancing said switch to the next successive contact thereof,
(l) means comprising a terminal contact at said stepping switch for re-setting the system to its original idle position, and
(m) time-delayed relay means controlled by said secondary amplifier for re-activating the system following the setting thereof to its idle position upon the return of said stepping switch to its starting point.

21. A telephone communication system for automatically dialing any desired pre-settable telephone number in response to the occurrence of a predetermined event, comprising (a) a circuit closer connected to a direct-current electrical energy source, adapted to be closed upon the occurrence of the predetermined event,
(b) a solenoid operated in response to the closure of said circuit-closer for mechanically lifting the telephone instrument from its support to condition the telephone line for intelligence transmission and the initiation of a dial-tone in the receiver of said instrument, (c) discriminating amplifying means for the audible dial-tone energy as well as audible "ringing tone" and "busy tone" energy which are adapted to emanate from said receiver, (d) control means derived from said amplified dial tone energy for producing a plurality of successive energy pulses, (e) a stepping switch operated by said energy pulses having a plurality of contacts of at least the number of digits required to dial the number of a called party, (f) a plurality of adjustable switches of at least a number corresponding to the number of digits in the number to be dialed, and adapted to be pre-set to any desired number to be called, each adjustable switch having a movable armature connected to one of the contacts of said stepping switch in the succession of the digits of the number being called and in the order of the movement of said stepping switch over said successive contacts from a neutral position, and each adjustable switch also having at least a plurality of terminals adapted for selective contact with said armature, corresponding in number to the dialing positions of the telephone instrument, (g) a plurality of electrical solenoids having movable plungers and energizing coils therefor, overlying each of the dialing positions of the telephone instrument to initiate automatically the required dialing operation, each of said coils being connected to a corresponding terminal of each of said pre-set adjustable switches, and adapted to be energized upon the coincidence of the set position on the latter with the sequential position of the stepping switch corresponding to the position of the desired digit in the group of digits constituting the called number, (h) means for completing the required dialing operation at each contact station of said stepping switch and advancing said switch to the next successive contact thereof, (i) means comprising a terminal contact at said stepping switch for re-setting the system to its original idle position, and (j) control means operated by said amplified "busy-tone" energy for re-activating said system for the repetition of the sequence of operations incident to the dialing of the desired number until a "ringing tone" is ultimately generated in said telephone receiver.

22. An apparatus as set forth in claim 21, wherein said discriminating amplifying means comprises a count-integrating amplifier responsive to the higher pulse-repetition frequency of the "busy-tone" signal energy in comparison to that of the normal "ringing tone" signal energy.

23. An apparatus as set forth in claim 22, wherein said last-mentioned means comprises a time-delayed relay device for effecting the repeated dialing of the pre-set number.

24. A telephone communication system for automatically dialing any desired pre-settable telephone number in response to the occurrence of a predetermined event, comprising (a) a circuit closer connected to a direct-current electrical energy source, adapted to be closed upon the occurrence of the predetermined event, (b) means operated in response to the closure of said circuit-closer for mechanically lifting the telephone instrument for its support to condition the telephone line for intelligence transmission and the initiation of a dial tone in the receiver of said instrument, (c) discriminating amplifying means for the audible dial-tone energy as well as audible "ringing tone" and "busy tone" energy which are adapted to emanate from said receiver, (d) a plurality of electrical solenoids and energizing coils therefor overlying each of the dialing positions of the telephone instrument, (e) pulse generating means actuated by said dial tone for producing a plurality of pulses of at least as great in number as the digits of the pre-settable telephone number, (f) a stepping switch having a number of stations at least as great as the number of digits in said last-mentioned telephone number, (g) means for operating said stepping switch successively by said plurality of pulses, (h) a plurality of adjustable electrical switches with connections extending therefrom in circuit with said stepping switch and each solenoid-energizing coil, adapted to actuate an individual solenoid at each successive station of the stepping switch for the transmission of the dialing impulses over the telephone line, in response to the completion of a circuit from the latter to a specific energizing coil as determined by the pre-set dialing digit on one of said switches in the sequence of the digits being dialed, (i) means comprising a terminal contact at said stepping switch for re-setting the system to its original idle position, and (j) control means operated by said amplified "busy-tone" energy for re-activating said system for the repetition of the sequence of operations incident to the dialing of the desired number until a "ringing tone" is ultimately generated in said telephone receiver.

25. An apparatus as set forth in claim 24 wherein at least some of said adjustable switches include an idle terminal having no connection with a solenoid-energizing coil so that the stepping switch is adapted to execute its movements between the stations thereof while selectively avoiding the actuation of solenoids in the dialing sequence.

26. An apparatus as set forth in claim 24, including an additional set of adjustable electrical switches adapted to be connected in circuit with said stepping switch and solenoid-energizing coil for presetting another telephone number thereon to transmit to another called party at the occurrence of a different predetermined event.

References Cited

UNITED STATES PATENTS

| | | | |
|---|---|---|---|
| 2,579,983 | 12/1951 | Thorton | 179—90 |
| 2,839,608 | 6/1958 | Moyer | 179—5 |
| 3,267,221 | 8/1966 | Caldwell | 179—5 X |
| 3,360,607 | 12/1967 | Oppenheimer | 179—5 |
| 3,404,236 | 10/1968 | Halaby | 179—5 |
| 3,407,269 | 10/1968 | Brzoska | 179—5 |
| 3,109,894 | 11/1963 | Humphreys | 179—5 |
| 3,124,650 | 3/1964 | Rostad | 179—5 |
| 3,207,850 | 9/1965 | Foreman | 179—5 |

RICHARD MURRAY, Primary Examiner

K. W. WEINSTEIN, Assistant Examiner

U.S. Cl. X.R.

179—90